United States Patent
Rosefsky

(10) Patent No.: US 8,148,839 B2
(45) Date of Patent: Apr. 3, 2012

(54) RIBBON DRIVE POWER GENERATION AND METHOD OF USE

(76) Inventor: Jonathan B. Rosefsky, Wynnewood, PA (US)

( * ) Notice: Subject to any disclaimer, the term of this patent is extended or adjusted under 35 U.S.C. 154(b) by 452 days.

(21) Appl. No.: 12/497,334

(22) Filed: Jul. 2, 2009

(65) Prior Publication Data

US 2010/0001529 A1     Jan. 7, 2010

Related U.S. Application Data

(60) Provisional application No. 61/077,696, filed on Jul. 2, 2008.

(51) Int. Cl.
| F01D 15/10 | (2006.01) |
| F02C 6/00  | (2006.01) |
| H02K 7/18  | (2006.01) |
| H02P 9/04  | (2006.01) |

(52) U.S. Cl. .......................................................... 290/52
(58) Field of Classification Search ..................... 290/52
See application file for complete search history.

(56) References Cited

U.S. PATENT DOCUMENTS

| 4,963 | A | * | 2/1847 | Armstrong et al. ........... 416/189 |
| 85,508 | A | * | 1/1869 | Beach ....................... 416/132 R |
| 1,631,069 | A | * | 5/1927 | Smith ............................ 415/75 |
| 1,816,971 | A | * | 8/1931 | Hoff et al. ....................... 415/75 |
| 2,334,302 | A | * | 11/1943 | Akins ............................ 415/75 |
| 2,568,903 | A | * | 9/1951 | Vassar ............................ 440/48 |
| 3,071,194 | A | * | 1/1963 | Geske ............................ 60/698 |
| 3,818,703 | A | * | 6/1974 | Lapeyre ......................... 60/504 |
| 3,818,704 | A | * | 6/1974 | Lapeyre ......................... 60/504 |
| 3,924,966 | A | * | 12/1975 | Taminini ...................... 416/177 |
| 3,980,527 | A | * | 9/1976 | Lapeyre ........................ 202/175 |
| 4,039,849 | A | * | 8/1977 | Mater et al. .................... 290/55 |
| 4,086,026 | A | * | 4/1978 | Tamanini ..................... 416/176 |
| 4,218,175 | A | * | 8/1980 | Carpenter ................... 415/219.1 |
| 4,313,404 | A | * | 2/1982 | Kossel ......................... 123/56.5 |
| 4,384,212 | A | * | 5/1983 | Lapeyre ......................... 290/53 |
| 4,412,417 | A | * | 11/1983 | Dementhon .................... 60/497 |
| 4,443,708 | A | * | 4/1984 | Lapeyre ......................... 290/53 |
| 4,464,579 | A | * | 8/1984 | Schwarz ......................... 290/44 |

(Continued)

FOREIGN PATENT DOCUMENTS

EP     0445855 B1     10/1994

(Continued)

OTHER PUBLICATIONS

International Search Report and Written Opinion of the International Searching Authority in PCT/US2010/040773 mailed Feb. 23, 2011.

*Primary Examiner* — Pedro J Cuevas
(74) *Attorney, Agent, or Firm* — The Marbury Law Group, PLLC

(57) ABSTRACT

The ribbon drive generation apparatus is comprised of a ribbon-like curved shape, composed either of metal or other suitable material, attached to a containment tube, peripheral rings, shaft, or porous central tube, with the complete apparatus being contained in a tube having a constant diameter for the length of the tube. The ribbon can be peripherally mounted to the containment tube and optionally to a central porous tube. In this form the containment tube rotates and can form part of a rotor for a generator apparatus. The optional central porous tube can also be used as a bearing surface or, if attached to the inside edge of the ribbon, a power take-off shaft.

17 Claims, 6 Drawing Sheets

U.S. PATENT DOCUMENTS

| | | | | |
|---|---|---|---|---|
| 4,481,020 A * | 11/1984 | Lee et al. | | 96/214 |
| 4,500,259 A * | 2/1985 | Schumacher | | 416/122 |
| 4,636,707 A * | 1/1987 | Law | | 322/35 |
| 4,708,592 A * | 11/1987 | Krolick et al. | | 416/176 |
| 4,717,832 A * | 1/1988 | Harris | | 290/43 |
| 4,849,647 A * | 7/1989 | McKenzie | | 290/54 |
| 5,121,819 A * | 6/1992 | Tecza | | 188/306 |
| 5,139,391 A * | 8/1992 | Carrouset | | 415/74 |
| 5,313,103 A * | 5/1994 | Hickey | | 290/54 |
| 5,324,177 A | 6/1994 | Golding et al. | | 417/423.1 |
| 5,386,146 A * | 1/1995 | Hickey | | 290/55 |
| 5,451,137 A * | 9/1995 | Gorlov | | 415/7 |
| 5,642,984 A * | 7/1997 | Gorlov | | 416/176 |
| 5,951,262 A * | 9/1999 | Hartman | | 417/356 |
| 6,000,915 A * | 12/1999 | Hartman | | 417/356 |
| 6,036,443 A * | 3/2000 | Gorlov | | 416/176 |
| 6,357,997 B1 * | 3/2002 | Rosefsky | | 415/60 |
| 6,357,998 B1 * | 3/2002 | Rosefsky | | 415/66 |
| 6,431,926 B1 * | 8/2002 | Rosefsky | | 440/48 |
| 6,527,520 B2 * | 3/2003 | Rosefsky | | 417/53 |
| 6,592,335 B2 * | 7/2003 | Rosefsky | | 417/53 |
| 6,626,638 B2 * | 9/2003 | Rosefsky | | 415/4.3 |
| 7,018,170 B2 * | 3/2006 | Rosefsky | | 415/72 |
| 7,044,711 B2 * | 5/2006 | Duncan, Jr. | | 416/198 R |
| 7,600,963 B2 * | 10/2009 | Miller | | 415/4.3 |
| 7,728,454 B1 * | 6/2010 | Anderson, Jr. | | 290/54 |
| 7,911,074 B2 * | 3/2011 | Anderson | | 290/54 |
| 7,938,622 B2 * | 5/2011 | Anderson, Jr. | | 416/6 |
| 2002/0062644 A1 * | 5/2002 | Rosefsky | | 60/398 |
| 2002/0064465 A1 * | 5/2002 | Rosefsky | | 417/53 |
| 2002/0150465 A1 * | 10/2002 | Rosefsky | | 415/66 |
| 2004/0033142 A1 * | 2/2004 | Rosefsky | | 417/53 |
| 2005/0074322 A1 * | 4/2005 | Duncan, Jr. | | 415/2.1 |
| 2007/0041823 A1 * | 2/2007 | Miller | | 415/4.1 |
| 2007/0179015 A1 * | 8/2007 | Johnson et al. | | 477/8 |
| 2008/0292478 A1 | 11/2008 | Baykut et al. | | 417/420 |
| 2009/0146430 A1 * | 6/2009 | Sear | | 290/54 |
| 2010/0278650 A1 * | 11/2010 | Parker | | 416/176 |
| 2011/0285134 A1 * | 11/2011 | Ortiz et al. | | 290/52 |
| 2011/0285135 A1 * | 11/2011 | Ortiz et al. | | 290/52 |
| 2011/0286770 A1 * | 11/2011 | Hayashi et al. | | 399/254 |
| 2011/0318045 A1 * | 12/2011 | Terai et al. | | 399/100 |
| 2012/0007362 A1 * | 1/2012 | Bannister | | 290/44 |
| 2012/0017559 A1 * | 1/2012 | Buchko | | 56/249 |

FOREIGN PATENT DOCUMENTS

EP  0671563 A1  9/1995

* cited by examiner

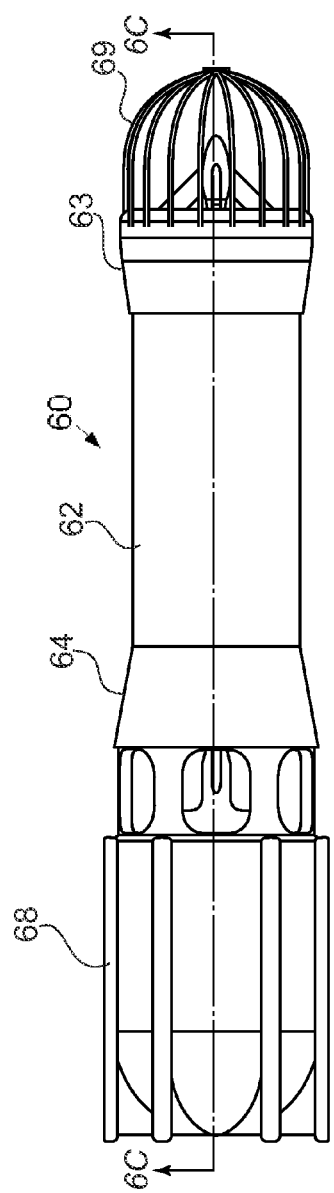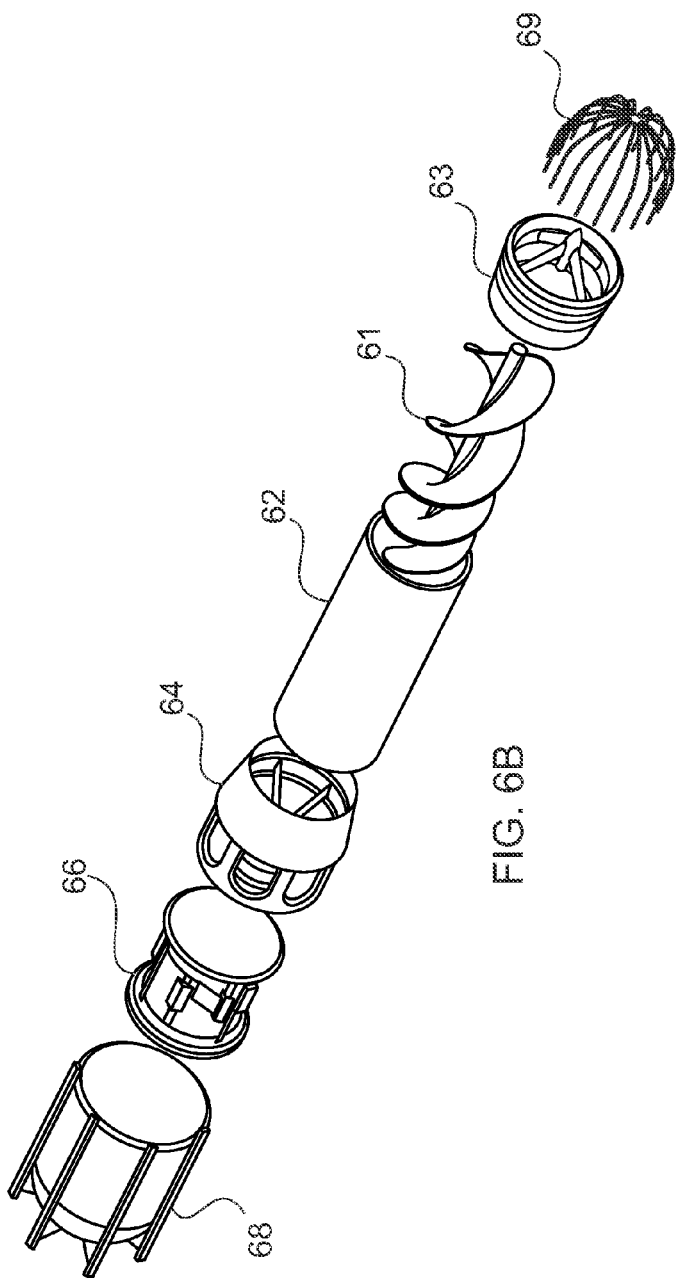

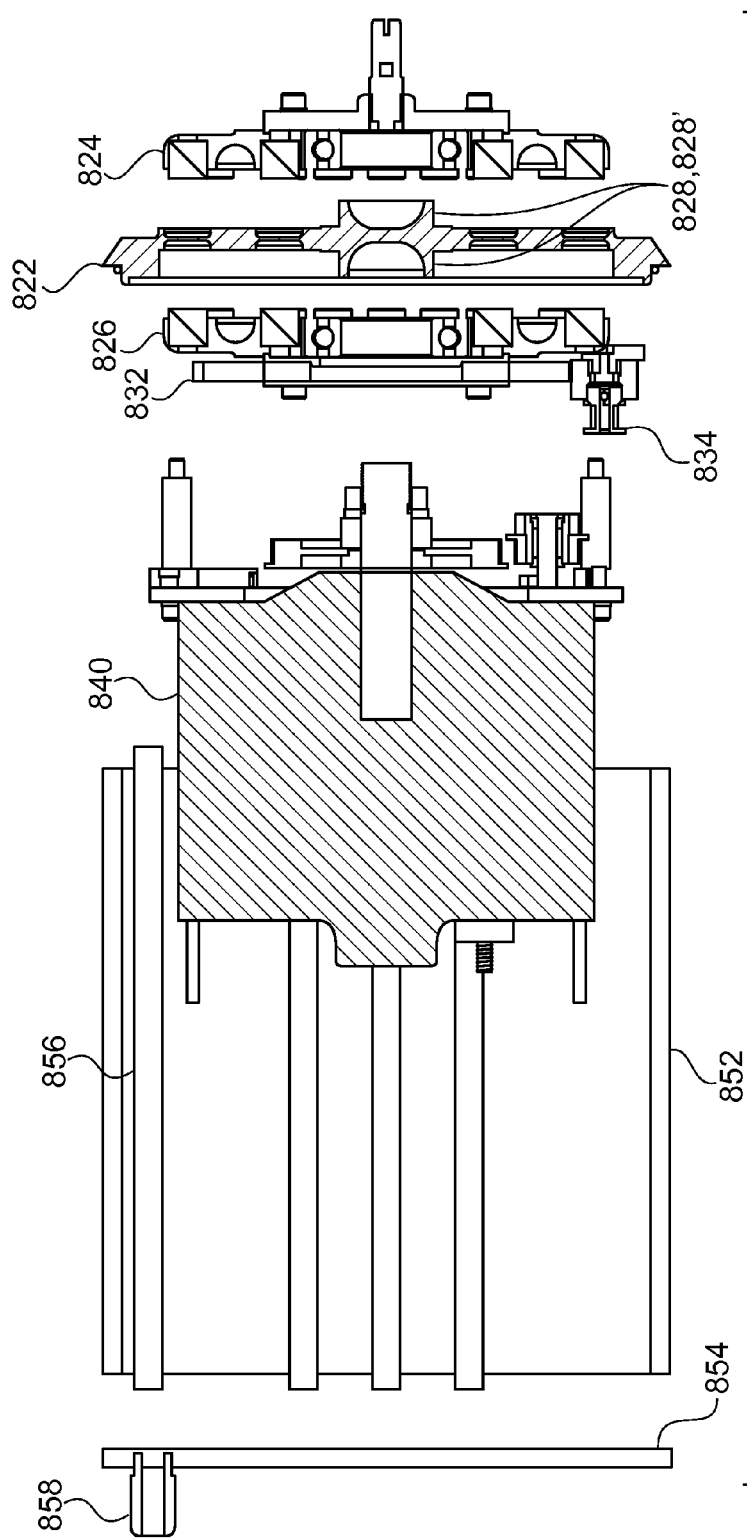
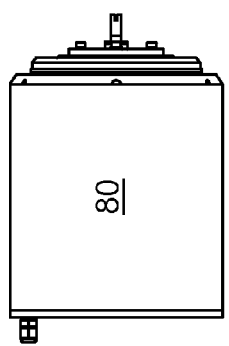
FIG. 8A
FIG. 8B

RIBBON DRIVE POWER GENERATION AND METHOD OF USE

RELATED APPLICATIONS

This application claims the benefit of U.S. Provisional Application Ser. No. 61/077,696, filed Jul. 2, 2008, which is hereby incorporated by reference.

BACKGROUND

Disclosed embodiments relate generally to an apparatus and method for producing power using a ribbon drive mechanism. More particularly, embodiments include a ribbon drive electrical power generator apparatus and method, including those with a peripherally-attached ribbon and central screen, as well as methods of using alternative fluids for power generation and methods and apparatus related to a generator assembly for use with such ribbon drive electrical power generation methods and apparatus.

The present inventor's prior U.S. patents disclose various ribbon drive systems, including U.S. Pat. No. 6,357,997, which discloses a ribbon drive power generation system and its use in a hydroelectric peak shaving system, U.S. Pat. No. 6,626,638, which discloses a ribbon drive power generator that allows additional applications, such as use in free flowing currents and use in variable flow environments, and U.S. Pat. Nos. 6,592,335 and 6,431,926, which disclose ribbon drive pumping and propulsion systems with a peripherally-mounted ribbon.

BRIEF DESCRIPTION OF THE FIGURES

FIGS. 6A-6E illustrate various views of an embodiment of a ribbon drive electrical power generation unit.

FIGS. 8A-8B illustrate an embodiment of a water-tight power management assembly useful with the power generation system.

DETAILED DESCRIPTION

Figure 1:
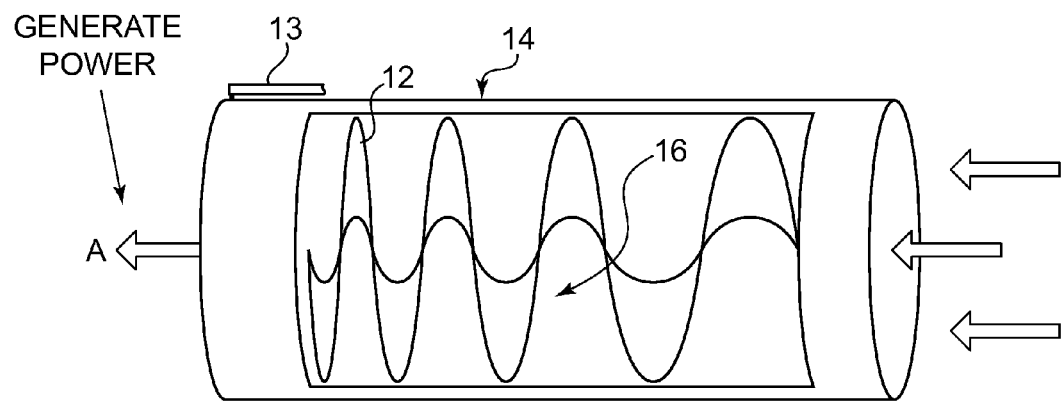
FIG. 1 illustrates the peripheral design for power generation system.

Referring to FIG. 1, the peripheral design is illustrated in which the ribbon 12 is attached at an outer edge to the containment tube 14. The ribbon drive generator apparatus consists of a ribbon-like curved shape vane 12, composed of metal or other suitable material, attached to the interior periphery of a spinning containment tube 14 or a series of peripheral rings having a constant diameter for the length of the containment tube 14. Fluid flows through the generating apparatus in the direction of the arrows and contacts the ribbon or vane 12, causing the entire containment tube 14 to rotate or spin. Magnets attached to the rotating containment tube 14 or to rotating peripheral rings or other such rotor structures at 13 are thus rotated as part of a generator structure to generate electricity. Structure 13 may also take the form of a power take-off pulley or gear surface on an exterior of the tube. The stator and field coil windings can be attached to a fixed, stationary outer cylinder. In such an embodiment, roller bearings, magnetic non-contact bearings, or other methods maintain a low or zero friction separation of outer fixed and inner rotating cylinder, rings or tube.

Fluid passed through the tube can be virtually any fluid, including but not limited to fluid passed through the tube that is selected from the group consisting of fluids that are liquids only when pressurized, and liquids not requiring pressurization such as but not limited to hydrocarbons, fuels, milk, whey, blood, blood plasma, and silicone.

A characteristic of the ribbon or vane 12 is that there is a change in the frequency of curves of the ribbon, which proceeds from a low frequency (few coils per unit length) at the leading portion of the apparatus to a high frequency (many coils per unit length) at the trailing portion of the apparatus. The apparatus looks similar to a corkscrew but has a decreasingly stretched frequency of coils as one proceeds down the length of the ribbon. For example, in appearance, at the intake point for the fluid, the ribbon or vane 12 would present a gradual curve at an angle of approximately 30 degrees to the axial flow of the incoming fluid and changing/progressing to a tightly curved angle at the exit point for the fluid, with said angle being steep (low pitch) but not perpendicular to the flow of fluid passing through the apparatus and thereby reducing the axial velocity of the fluid passing through the apparatus (these angles are not meant as a limitation to the apparatus since other angles may prove to be beneficial). However, said reduction in velocity of the fluid is countered to some degree by the venturi effect of a narrowing channel as the coil angle becomes steeper (higher frequency of coils, shorter axial distance for each subsequent 360 degrees of a coil). This effect of a narrowing channel becomes more obvious when plural ribbons are incorporated (see, e.g., FIG. 5).

This reduction of axial velocity of the fluid is a consequence of a transfer of energy from the fluid to the apparatus, thus turning the ribbon 12. The containment tube 14 prevents loss of energy to the sides as would be the case with a typical open hydraulic turbine type design. A central opening 16 allows fluid to pass through the apparatus unobstructed to maintain desired fluid flow and to help prevent excessive internal buildup of pressure that might impede fluid flow. In this manner, the apparatus will only receive or bleed off part of the fluid energy.

Figure 2:
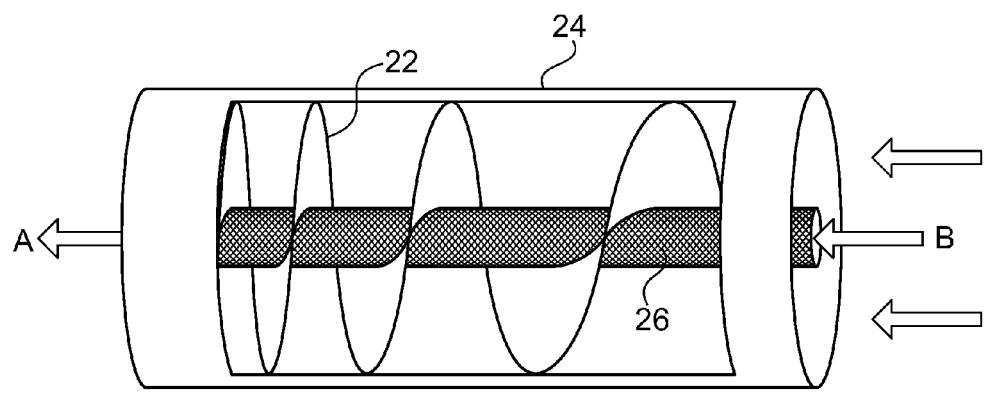
FIG. 2 illustrates another embodiment of a ribbon or coil assembly useful with the power generation system.

FIG. 2 illustrates another embodiment, again with ribbon or vane 22 and containment tube 24. In this embodiment, element 26 can be a power take-off shaft, with ribbon 22 attached at an inside edge to the element 26, or it can be a porous tube as part of a peripheral design. In this embodiment, porous tube 26 can either be attached to the inside edge of ribbon 22, where it can further act as a power take-off shaft, or it can be stationary, possibly acting as a filter and/or bearing surface for rotation of ribbon 12. Further, the ribbon 22 can be attached as well both to the inner edge of a rotating containment tube element 24, or to peripheral rings linked in such a way as to stabilize the rotating ribbon 22 at an outside edge of the ribbon or vane, and attached to a central shaft or porous tube at an inside edge of element 26.

When used as a power take-off shaft, element 26 can be attached to and used to power any of a number of means of electrical generation. Power could be transmitted from the shaft to the means of electrical generation by the use of gears, pulleys, belts, or a continuously variable transmission (in place of 832 and 834 in FIG. 8A) or any variety of combinations of techniques, or by electrical power induction from the peripheral vane edges utilizing methods such as, but not limited to, magneto-electric induction, with magnets on the vane outer edges, and with stator(s) and coils on the outside of the fixed outer containment cylinder, such as illustrated below in FIG. 7A.

Figure 3:
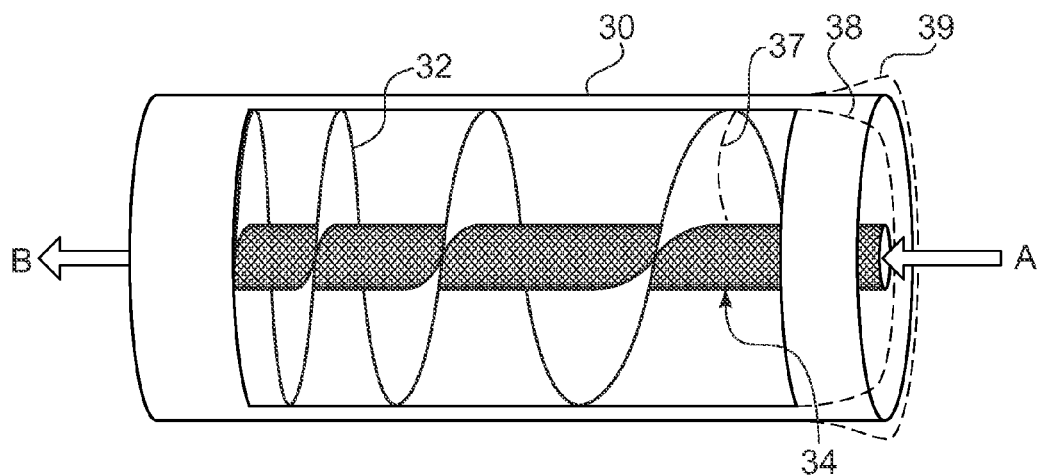
FIG. 3 illustrates another embodiment of a ribbon or coil assembly useful with the power generation system.

Referring to FIG. 3, the apparatus interior design is illustrated. The porous tube 34 has a ribbon 32 attached to it. Visually, this representation appears much like the thread of a screw attached to a central core. The ribbon rotates within a containment tube 30, to which it is attached at the interior periphery (i.e., the inner surface) of containment tube 30. Fluid flows through the power generation system in the direction of the arrows as the entire corkscrew-like design rotates along with the containment tube 30.

Fluid initially enters the containment tube 30 at point A and encounters the low frequency coils, which present a gradual curve of approximately 30 degrees to the axial flow of the incoming water. The ribbon changes, progressing to a tightly curved, steep angle (high frequency coil) at the exit point for the water, with said angle at this point B at a steep angle (low pitch) but not perpendicular to the flow of water passing through the apparatus and thereby further reducing the velocity of the water passing through the apparatus.

As before, the reduction of velocity of the fluid is a consequence of a transfer of energy from the fluid to the apparatus, thus turning the porous tube 34, ribbon 32 and containment tube 30 of the apparatus. Rotation of the ribbon-like apparatus is initiated at the low-frequency coil, with energy incrementally transferred as fluid, hitting the initial low frequency coil, sets the apparatus spinning slowly, progressing gradually to higher frequency coils which additionally convert energy of the linear axial velocity component of water to rotational energy. Due to the narrowing channel(s) through which water passes en route to the exit, there is a tendency for water velocity to increase by the venturi effect with a consequent boost in the rotational speed by the time the initially slowed water finally contacts the terminal high frequency, tightly-curved coil where further energy transfer occurs. If the terminal high frequency, steepest coil is at too close to vertical, it will act as a wall and water transit will cease, resulting in standstill and therefore should be avoided.

The porous tube 34 of the apparatus, which can be formed of screen material, operates to allow a portion of fluid to pass through the apparatus, generally to maintain fluid flow and to help prevent internal pressures from becoming too high. If attached to the ribbon 32, the tube 34 of the apparatus could be attached to and used to power any of a number of means of electrical power generation. In this manner, power could be transmitted from the central axle 34 of the power generation apparatus to the means of electrical power generation by the use of gears, pulleys, belts, continuously variable transmission or any of a variety of combinations of techniques. Alternatively, the system could be configured to directly induce electricity as a rotor element with magnets, stators and electrical coil windings, although this is still considered a "generator means" for the purposes of this disclosure.

The curved ribbon may be cupped 37 and made of metal, plastic, composite or other sturdy material. The frequency of the ribbon may be fixed (static) or variable (dynamic or adjustable). It can be made variable by segmenting the ribbon into a contiguous length of hinged, interlocking, or overlapping blades, which are movable by reason of linkages or sliding splines (or other means to those skilled in the art) along the length of the ribbon band, or by linear elongation or contraction of the coiled ribbon vane element. The innermost central edge of the ribbon can be attached to the porous tube, which can include tubular sections that slide longitudinally or include slots within which the innermost edge attachment of the ribbon can be adjusted to slide, or by other methods. The material of the ribbon can have limited but finite flexibility/extensibility, to permit adjustment as the flow source varies. The tube 30 can also have small portions 38, 39 of varying diameter at the intake or outlet end.

Figure 4:
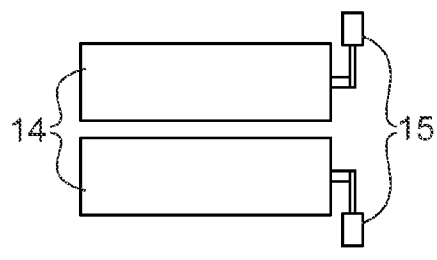
FIG. 4 illustrates a plural generator embodiment.
Figure 5:
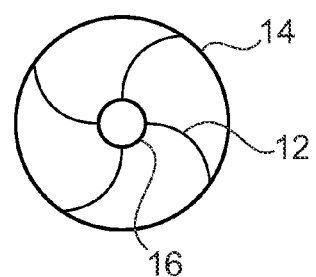
FIG. 5 illustrates a plural ribbon embodiment of a ribbon or coil assembly useful with the power generation system.

Referring to FIG. 4, plural ribbon drive apparatuses (of which tube 14 is visible) can be used to drive generators 15, either in parallel or in series. Additionally, each apparatus can have plural ribbons 12 equally spaced on the interior circumference of the tube 14, as illustrated in FIG. 5.

Figure 6C:
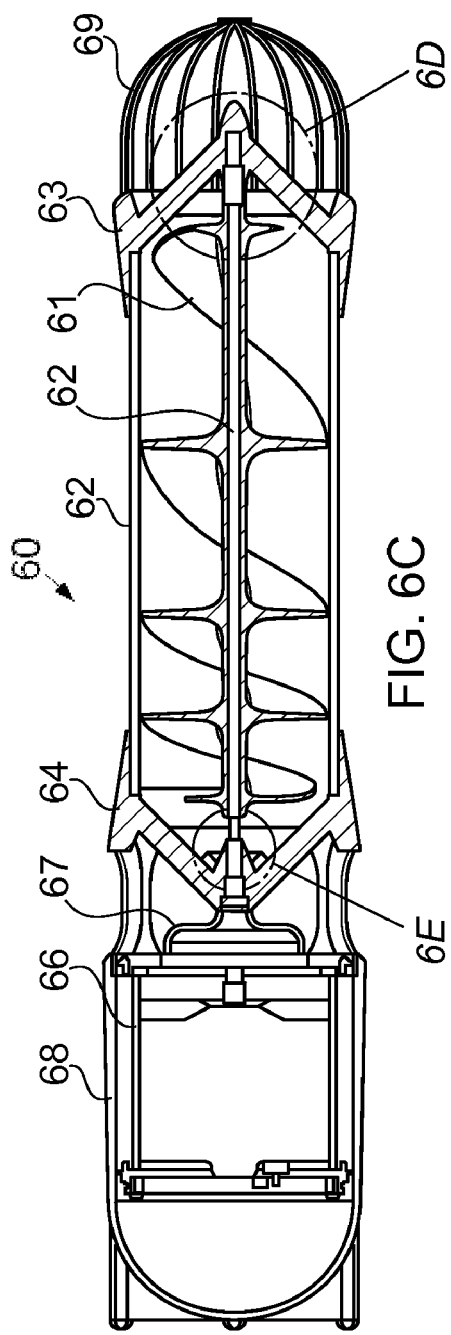
Figure 6E:
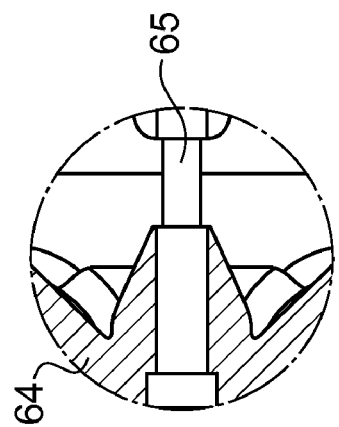
Figure 6D:
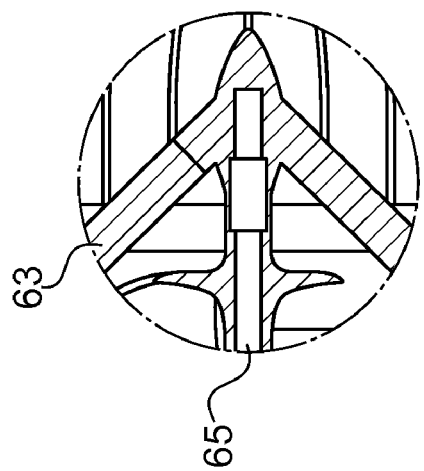

Referring to FIG. 6A-6E, an embodiment of a ribbon drive electrical power generator is illustrated in FIG. 6A, with corresponding FIG. 6B illustrating an exploded view of the embodiment, corresponding FIG. 6C illustrating a sectional view of the embodiment, and FIGS. 6D and 6E providing detail views of portions of FIG. 6C.

The ribbon drive electrical power generator assembly 60 is illustrated in FIGS. 6A-C. The ribbon drive electrical power generator assembly 60 has a ribbon or coil 61 that is inserted into containment tube 62. The containment tube 62 preferably has threads on the outside of the ends (e.g., standard NPT or NTP threads) for connection to corresponding threads on forward collar 63 and aft collar assembly 64. The outer edge of the forward collar can be flared outward to augment fluid entry. The exit edge of the aft collar can be flared outward to facilitate turbine water exit and to help prevent ambient water from flowing inward toward the turbine exit openings. As illustrated in FIGS. 6E and 6F, forward collar 63 and aft collar assembly 64 include bearings for rotational mounting of the ribbon or coil 61 via its central shaft 65. While forward collar 63 only requires a bearing and an open structure for the inlet of fluid, aft collar assembly 64 further needs to couple shaft 65 to the generator assembly 66, preferably via a coupling to a magnetic clutch 67, and has peripheral openings to allow the fluid to exit the assembly 60.

The magnetic clutch 67 is part of a generator assembly 66 that can further include reduction gearing and a generator or alternator (permanent magnet or otherwise) generating electricity (element 840 as further disclosed in FIG. 8A). While the generator assembly can have its own integral outer housing, in the disclosed example, a rear shroud 68 encloses the generator assembly and supporting attachments 66 to act as an outer housing and attaches to the rear collar assembly 64. The shroud 68 can also include stabilization fins for use in free flowing areas or aligned weight-bearing surfaces for cooperating with an outer bearing surface on the forward collar 63 for use in appropriately-sized conduits. When used in a conduit, the standoff from the bearing surfaces on shroud 68 should be sufficient to allow continued acceptable flow of the fluid exiting the aft collar assembly 64 and passing around the forward, outside clutch assembly 67.

The forward collar 63 preferably uses low-drag supports for positioning and support of the central bearing and is largely open so as to allow the free flow of fluid into the containment tube 62. However, in order to prevent fouling or damage to the coil 61, a grill 69 may be used to cover the opening in forward collar 63. The grill 69 can attach in any suitable manner (such as snapping or screwing onto collar 63), but is preferably removable for servicing the assembly 60. The grill 69 is also preferably shaped to deflect debris away from the assembly to avoid undesirable blockage of the fluid flow.

In use, the assembly 60 can be made in various sizes and from various materials, dependent on the end application. For example, for use in conduits, such as to draw power from water running in pipes, the assembly can be sized in accordance with the conduit/pipe diameter.

Figure 7A:
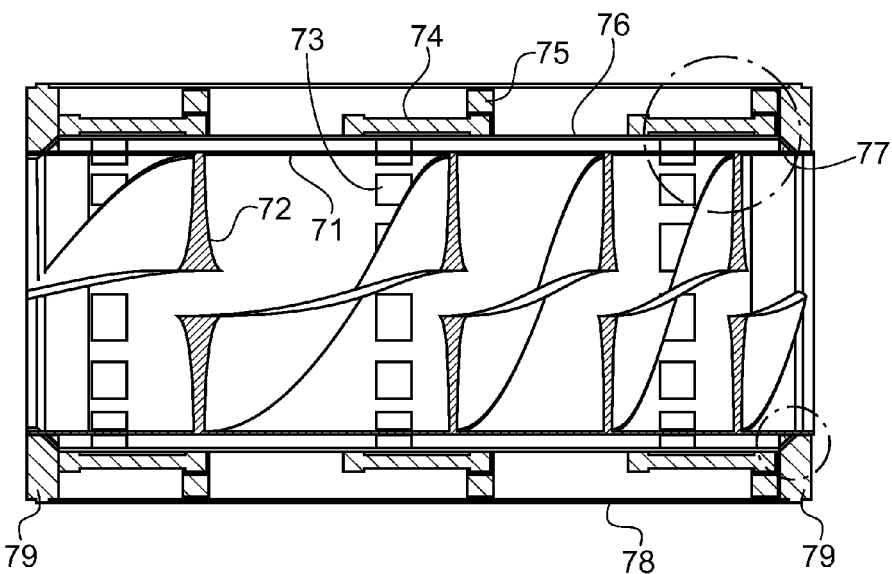
FIGS. 7A-7C illustrate various views of an embodiment of a ribbon drive power generation system.
Figure 7B:
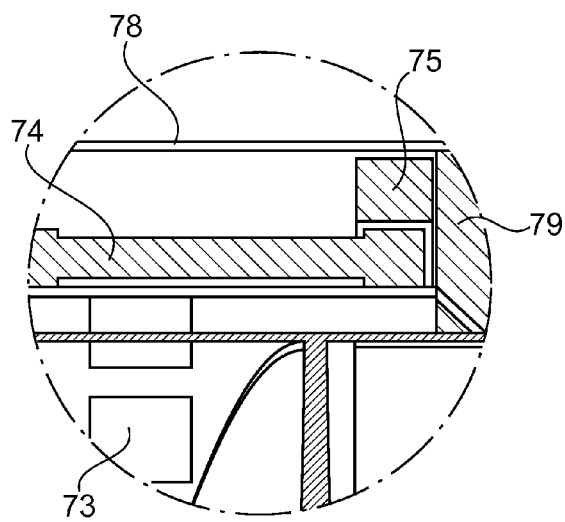
Figure 7C:
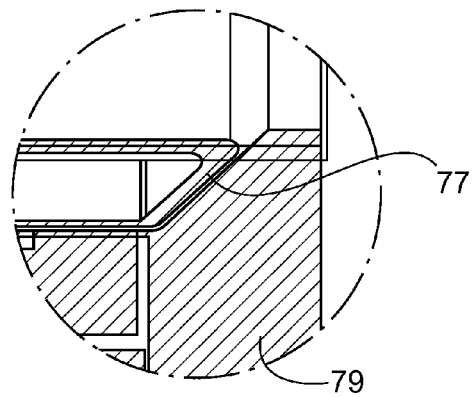

Referring to FIG. 7A, another embodiment of generator assembly 70 is disclosed. FIG. 7A illustrates sectional view of the unit with a sealed cover 78 between end collars 79. In this embodiment, the periphery of ribbon or coil 72 is attached to the containment tube 71. Magnets 73 on the outer periphery of containment tube 71 are moved relative to the stators 74 and field coils 75 that are fixed on a stationary mounting tube 76 between end collars 79 so as to generate electricity. The relative arrangement is disclosed in more detail in FIG. 7B. Preferably, magnetic bearings 77 between the ends of the containment tube 71 and the end collars 79 are used to rotationally support the coil 72, tube 71, and magnets 73, as illustrated in more detail in FIG. 7C. The space between tube 71 and cover 78 can be filled with lubricant, coolant, sealant gases, or the fluid flowing through tube 71.

This embodiment is useful for fixed applications since the outside of the unit 70 is meant to be fixed, and is generally more suited to use mounted in-line with conduits and pipes since it does not restrict the flow at the outlet as do embodiments such as the one illustrated in FIGS. 6A-6C. In a related embodiment, elements 74, 75, and 76 can be mounted on the outside of a pipe or tube conveying fluid. Elements 71, 72, 73, 77 and 79 would be mounted inside said pipe or tube serving as a conduit for fluid. Fluid passing through 71 and 72 would cause their rotation, as previously described.

FIG. 8A illustrates an exploded cross-section of an embodiment of a water tight power management assembly (PMA) unit 80, and FIG. 8B illustrates the PMA 80 in an assembled, watertight state.

PMA 80 includes a magnetic clutch that has an outside magnetic coupler assembly 824 that couples to the shaft of a rotating ribbon or coil (not shown) so to convert the rotational movement of the shaft into electrical power in the PMA 80. A bearing on the outside magnetic coupler assembly 824 mounts to an outer bearing flange 828' on forward housing plate 822. A bearing on the inside magnetic coupler assembly 826 mounts to a inner bearing flange 828 on forward housing plate 822. Collectively, the forward housing plate 822 and the two magnetic coupler assemblies 824 and 826 are used to form a magnetic clutch for the PMA 80.

The inner magnetic coupler assembly 826 is coupled to a spur gear assembly 832 that interacts with a interchangeable pulley ratio assembly 834 so as to provide a reduction gear means for the PMA 80 that allows for interchangeable gear ratios so that the PMA 80 can be operated efficiently. The pulley on interchangeable pulley ratio assembly 834 transfers rotational power to a corresponding pulley on the driveshaft of a generator or alternator (permanent magnet or otherwise) 840 with a suitable drive belt (not illustrated). Alternately, assembly 834 can be a continuously-variable transmission (CVT) providing variable gear ratios.

The, e.g., alternator 840 is sealed in a watertight manner inside of a generally-cylindrical outer housing 852 that is sealed at a forward end with forward housing plate 822 and sealed at a rearward end with aft housing plate 854. Alternatively, the supportive housing plate can be located forward of the alternator. A watertight power cable plug 858 in aft housing plate 854 is used to allow a power cable (not illustrated) to carry the electricity generated by alternator 840 to another location for use or storage in a battery. The outer housing 852 preferably includes cooling tubes 856 to remove undesirable heat away from the alternator 840 during use.

The PMA unit 80 effectively provides a generator unit with both a magnetic clutch and a variable gear reduction mechanism so as to provide numerous benefits in a ribbon drive electrical power generator system or method. Use of a magnetic clutch eliminates having a continuous shaft directly from the end of the rotating ribbon or coil to the gear reduction mechanism associated with the alternator/generator. By eliminating the shaft, one can avoid having to use a tight bearing assembly to prevent fluid leakage into the alternator/generator housing that is directly in line with the ribbon or coil assembly. If a continuous shaft was used with water-tight bearings, the torque effort needed for the breakaway torque would be markedly increased and there would be significant ongoing frictional losses during shaft rotation.

Utilization of a magnetic clutch, with each half consisting of a round metal or polymer part with holes therein for the insertion of small permanent magnets, allows rotary energy of the forward shaft (continuous with the rotating ribbon or coils) to be transmitted to the separate rearward shaft contained with the reduction gearing, belts, and the alternator/generator and its shaft, housed in the watertight rearward metal or polymer canister. Each half of the magnetic clutch (i.e., magnetic coupler assembly) is on either side of, but not touching, a thin non-magnetic (i.e., aluminum or the like) plate that is part of the alternator/generator watertight canister.

The number of magnets in each half of the magnetic clutch can be adjusted so that when the R.P.M.'s or torque of the clutch reach a certain level, the clutch will begin to slip, thus preventing the alternator/generator unit from over-revving beyond a predetermined rotational or torque limit that would potentially damage the reduction gears, bearings, or belts, or the alternator/generator unit, whether by overheating or by premature wear of the bearings in the alternator/generator unit or by other means, any of which would decrease alternator/generator effectiveness, burn out the stator coils, or otherwise shorten its life cycle.

Utilization of the magnetic clutch can also eliminate the friction and the mass or inertia of other types of connections between alternator/generator and the ribbon or coil rotating mechanism, which types include but are not limited to a long axle associated with angled gearing to an alternator/generator located in a dry location above or to the side of the turbine mechanism, heavy gearing associated therewith, or to a drive belt(s) connecting the turbine shaft or housing which are in a water flow, to the alternator/generator which is not in the water.

Furthermore, use of a reduction gearing mechanism allows for easy adaptation of the ribbon or coil to differing rates of fluid or water flow or different water head at various sites or installations in order to match the desired performance curve, by enabling the relatively simple substitution of one set of gears with other sets (e.g., "swapping out", switching only the gears and belts) so as to alter the output-to-input gear ratio from, e.g., 2:1 to 0.5:1 (although these ratios are not meant to be limiting).

It may also be desirable to create a dual-use application of the power generation apparatus by adapting an alternator/generator unit which can be run in reverse by applying an electric current to its terminals, in order to convert its function to that of a motor, such as for powering marine propulsion or pumping of fluid). For example, the entire unit may alternately be oriented so that the watertight PMA containing the motor (alternator) to be energized is oriented to the front of a marine vessel, canal boat or barge, or personal water sled or runabout, and the former ribbon or coil entry becomes the water exit. A hydrodynamic bubble or form can be attached to the now frontward-facing motor module. Alternatively, the PMA containing the alternator/generator can be disconnected as a single unit and replaced with a motor and gearing and magnetic clutch inside a watertight canister with the correct size and dimensions to fit where previously the alternator/generator had been located.

In a related fashion, a ribbon drive electrical power generation apparatus can be made by converting a ribbon drive propulsion apparatus via reversing the orientation in flowing water, or with water conducted to the new entry end; using an electric motor that has been chosen for possible reversal of the power leads such that the propulsor now becomes a power generation unit. The spinning ribbon or coil vane component can be replaced with another one containing different angle or pitch to the coils in the vane[s], to achieve different performance characteristics.

In use, various embodiments can have application for use in: rivers or streams, bay currents, ocean currents, dams, marinas, vessels docked or moored or at sea, use with hydrokinetic systems extracting energy from wave or tidal action, summer homes or camping near flowing water, remote monitoring for meteorological or military or pipeline observational and other reporting purposes, emergency power for vessels stranded underwater or otherwise rendered motionless, downspouts, water fountains, shower heads, cardiovascular installation in a living being to provide electric current for various internal applications, milking machines, manufacturing processes using moving or recirculating fluids, pumping water into oil wells to reclaim more oil or fill voids, rooftop water towers, downpipes, replacement or supplementation of pressure relief valves inside water systems of multilevel buildings, operating by virtue of passage of compressed or supercold liquids such as methane or nitrogen (including extraterrestrial applications), and miniaturized micro circuitry where a flowing liquid can initiate miniscule ribbon drives to produce a small electric current to throw a switch/alter flow through different circuits. Said fluids may be electro-luminescent when an electric current is added, and color shown and its intensity may change depending on internal or other applied pressure changes. Parallel or intertwining of counter-directional power generation apparatus units may be employed in measurement scenarios or in intentionally fluctuating electric current scenarios as in motive, medical, stabilizing or gyroscopic applications.

Additionally, embodiments can be used to bleed very small amounts of energy from existing fluid systems to provide small amounts of electricity that are typically provided by sources such as batteries. In this manner, remote monitoring equipment such as flow rate monitors can be powered by the fluid or a branched portion of the fluid when the fluid is flowing. When incorporated at water or other fluid outlets such as, but not limited to shower heads, outside water faucets, and water fountains, the generator can be used to generate limited amounts of electricity for purposes such as generating electricity to light a shower stall, power nearby fans or radios, or provide lighting displays for public water fountains, respectively.

The apparatus and method can be employed in a variety of sizes based on the particular space or configuration restrictions of the area(s) in which it would be employed. The apparatus could also be employed in a variety of teaming arrangements in pairs, threes, fours, and so forth as well as in parallel or series based on the specific requirements of a particular installation. This flexibility allows power generation efforts to be employed in situations not ordinarily considered for power generation.

A system and method for ribbon drive electrical power generation has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

I claim:

1. A ribbon drive power generation apparatus comprising:
   a tube having a substantially constant diameter, an intake at a first end, and an outlet at a second end;
   at least one ribbon extending radially inward from an outer peripheral edge a length less than the radius of the tube to form a central, axial opening in the ribbon, the ribbon being located entirely within the tube in a longitudinal direction, and being formed of coils extending in a helical manner from the first end to the second end of the tube, wherein a frequency of coils per unit length of tube increases from the first end to the second end of the tube;
   a porous, rigid central tube attached to an inner edge of the ribbon; and
   means for obtaining power from rotation of the ribbon and the rigid central tube within the tube so as to generate power from fluid moving from the first end to the second end.

2. The power generation apparatus of claim 1, wherein the central tube is attached to the means for obtaining power.

3. The power generation apparatus of claim 1, further comprising a plurality of ribbons equally spaced on the interior circumference of the tube.

4. The power generation apparatus of claim 1, wherein said ribbon is cupped to have a concave curvature in a direction facing the inlet.

5. The power generation apparatus of claim 1, wherein the rigid central tube is coupled to a magnetic clutch that is coupled to an alternator.

6. The power generation apparatus of claim 5, wherein the magnetic clutch is coupled to the alternator through a reduction gear means.

7. The power generation apparatus of claim 6, wherein the reduction gear means is selected from the group consisting of interchangeable pulleys, interchangeable gears, and continuously-variable transmissions for adjusting a gear ratio of the gear reduction means.

8. The power generation apparatus of claim 1, wherein the means for obtaining power is selected from the group consisting of stator field windings, rotating magnets, a power take-off pulley surface on an exterior of the tube, and a power take-off gear surface on an exterior of the tube.

9. A ribbon drive power generation method comprising:
   providing a substantially constant diameter tube having an inner wall, an intake at a first end, and an outlet at a second end;
   passing a fluid through the tube for rotating at least one ribbon extending radially inward from an outer peripheral edge a length less than a radius of the tube to form a central, axial opening in the ribbon;
   providing a porous, rigid central tube attached to an inner edge of the ribbon;
   providing an electricity generation means;
   coupling the electricity generation means to the rigid central tube; and
   generating electricity from the rotation of the ribbon within the tube;

wherein said ribbon is located entirely within the tube in a longitudinal direction, and is formed of coils extending in a helical manner from the first end to the second end of the tube, and wherein a frequency of coils per unit length of tube increases from the first end to the second end of the tube.

10. The power generation method of claim 9, further comprising providing a plurality of ribbons equally spaced on the interior circumference of the tube.

11. The power generation method of claim 9, further comprising passing a fluid that is a liquid at the inlet.

12. The power generation method of claim 11, further comprising passing a fluid selected from the group consisting of hydrocarbons, fuels, milk, whey, blood, blood plasma, silicone, mercury, slurries, electroluminescent liquids, and fluids that are liquids only when pressurized.

13. The power generation method of claim 9, wherein coupling the electricity generation means to the rigid central tube further comprises coupling the rigid central tube to a magnetic clutch, coupling the magnetic clutch to a reduction gear mechanism, and coupling the reduction gear mechanism to an alternator.

14. The power generation method of claim 13, further comprising adjusting a gear ratio of the reduction gear mechanism by a method selected from the group consisting of interchanging pulleys in the reduction gear mechanism, interchanging gears in the reduction gear, and using a continuously-variable transmission.

15. A ribbon drive power generation method comprising:
providing a tube having a substantially constant diameter, an intake at a first end, and an outlet at a second end;
passing fluid through the tube to rotate at least one ribbon within the tube, wherein the ribbon is formed of coils extending in a helical manner from the first end to the second end of the tube, and a frequency of coils per unit length of tube increases from the first end to the second end of the tube, and wherein the ribbon extends radially inward from an outer peripheral edge a length less than the radius of the tube to form a central, axial opening in the ribbon;
providing a porous, rigid central tube attached to an inner edge of the ribbon;
providing a generator having rotary elements;
coupling the rigid central tube to the rotary elements of the generator; and
generating electricity using the rotating ribbon to move the rotary elements of the generator,
wherein the fluid passed through the tube is selected from the group consisting of hydrocarbons, fuels, milk, whey, blood, blood plasma, silicone, mercury, slurries, electroluminescent liquids, and fluids that are liquids only when pressurized.

16. The ribbon drive power generation method of claim 15, wherein the field of use is selected from the group consisting of use in: rivers or streams, tidal flows, bay currents, ocean currents, hydrokinetic wave applications, dams, marinas, vessels docked or moored or at sea, summer homes or camping near flowing water, remote monitoring for seismic, meteorological or military or pipeline observational and reporting purposes, emergency power for vessels stranded underwater or otherwise rendered motionless, water fountains, shower heads, cardiovascular installation in a living being to provide electric current for various internal applications, milking machines, manufacturing processes using moving or recirculating fluids, pumping water into oil wells to reclaim more oil or fill underground voids, emptying or refilling quarries, rooftop water towers, water piping in tall buildings, replacement or supplementation of pressure relief valves inside conduits or water systems of multi-level buildings, operating by virtue of passage of compressed or supercold liquids such as methane or nitrogen, extraterrestrial applications, and miniaturized micro circuitry where a flowing liquid can initiate miniscule ribbon drives to produce a small electric current to throw a switch/alter flow through different circuits.

17. The ribbon drive power generation method of claim 15, wherein coupling the rigid central tube to the rotary elements of the generator comprises coupling the rigid central shaft to a magnetic clutch, coupling the magnetic clutch to a reduction gear mechanism, and coupling the reduction gear mechanism to a shaft that moves the rotor elements of the generator, and wherein generating electricity using the rotating ribbon to move rotor elements of a generator comprises rotating the ribbon to rotate the rigid central shaft to rotate the magnetic clutch, to rotate the reduction gear mechanism, and rotate the shaft to move the rotor elements of the generator.

* * * * *